A. SOAMES AND W. LANGDON-DAVIES.
ELECTROMAGNETIC CLUTCH.
APPLICATION FILED OCT. 30, 1918.
1,306,784.
Patented June 17, 1919.
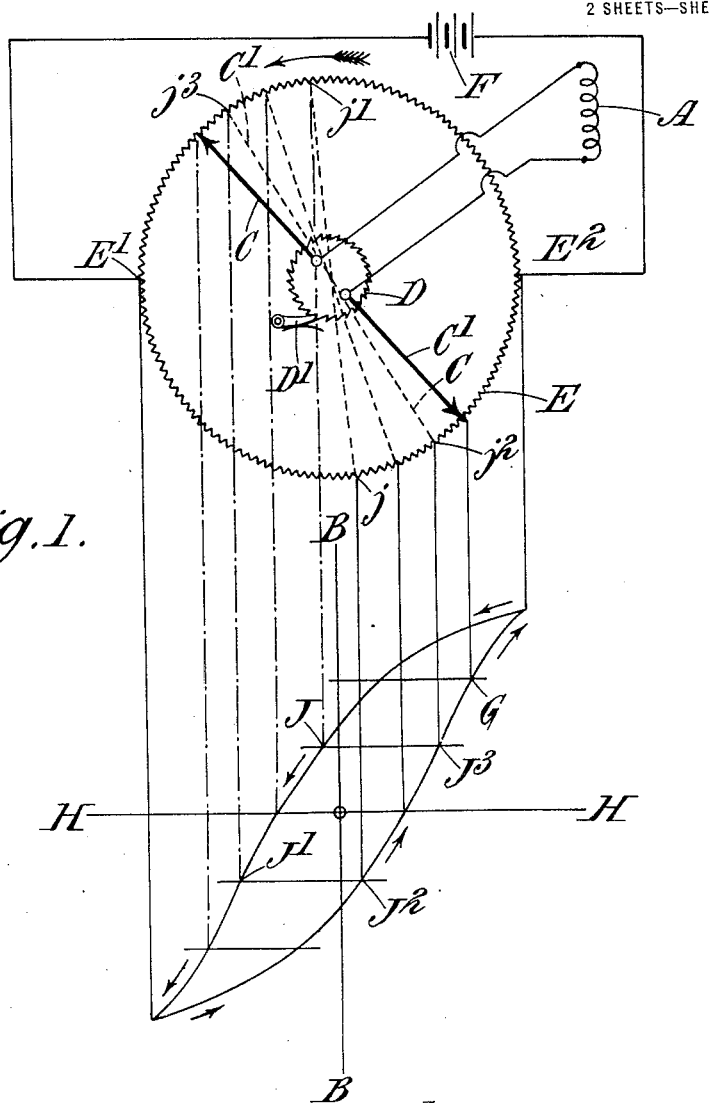

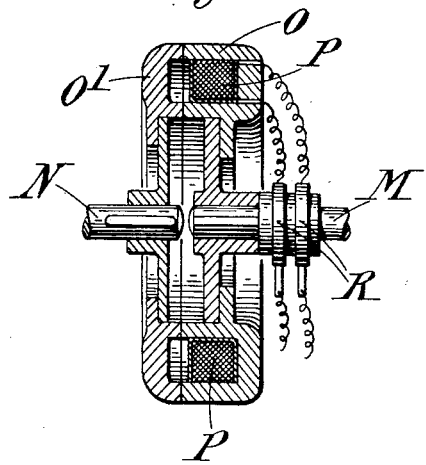
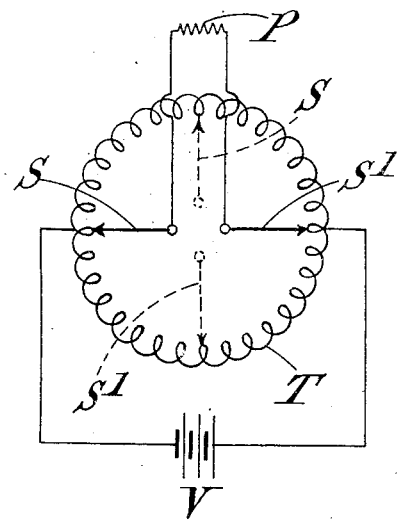

UNITED STATES PATENT OFFICE.

ALFRED SOAMES AND WALTER LANGDON-DAVIES, OF LONDON, ENGLAND.

ELECTROMAGNETIC CLUTCH.

1,306,784.     Specification of Letters Patent.     Patented June 17, 1919.

Application filed October 30, 1918. Serial No. 260,318.

*To all whom it may concern:*

Be it known that we, ALFRED SOAMES and WALTER LANGDON-DAVIES, subjects of the King of England, both residing at London, in England, have invented certain new and useful Improvements in Electromagnetic Clutches, of which the following is a specification.

This invention relates to electromagnetic friction clutches and has particular reference to clutches of the type in which there is no variable air gap between the clutch members and in which the driving pressure between such members is due to the magnetic field produced by a coil excited from some suitable source of voltage.

In such clutches the reluctance of the magnetic circuit is small owing to the fact that there is no appreciable air gap between the surfaces of the clutch members but for the same reason residual magnetism may cause trouble in making uncertain the point at which slip occurs between the members.

Such uncertainty is particularly disadvantageous when the clutch is used in circumstances where slip is required to take place at a definite point say for instance when the load on the driven side of the clutch exceeds a predetermined amount. In such circumstances the clutch is sometimes provided with one or more opposing coils which tend to counteract the effect of the actuating coil and cause slip to take place. If the magnetic condition of the iron were constant, the point at which the slip would take place would be definite that is to say it would always correspond with a definite ratio between the ampere turns of the actuating and opposing coils. Owing to residual magnetism however the magnetic condition of the iron is not constant but depends so to speak upon the history of the clutch that is the previous magnetization to which it has been subjected.

The primary object of the present invention is to eliminate this uncertain factor by providing means whereby any change in the density of magnetic flux in the iron due to alteration in the current passing through the magnetizing coil must always take place in the same direction in the cycle of magnetization.

The cycle is such that its point of greatest density is as great as or greater than the maximum at which the clutch is ever intended to operate and in some cases the magnetization of the iron is caused to pass through this maximum when a change in the magnetizing current is made and a new density value is reached by coming up on the upward side of the curve representing the cycle. It is however not always necessary thus to make the iron pass around its cycle so long as the change of flux always takes place in the same direction in the cycle.

When the iron is taken around the magnetization cycle the operation may be regarded as a preparation or setting of the iron and may be performed at any time between one use of the clutch and another. Although this preparation or setting of the iron is advantageous and sometimes necessary yet in many practical applications of the invention the only essential point is that the behavior of the clutch shall always be the same for any definite position of the switch controlling the current in the coil. For the behavior of the clutch to be the same presupposes that the flux density shall be constant for any given position of the controlling switch but this does not necessarily mean that the flux must be in the same direction; for in a given cycle of magnetization a point of flux density other than the maximum or zero will occur four times, once in a positive and once in a negative direction on the up side of the curve representing the cycle and similarly on the down side. These four points will be represented by four positions of the switch for controlling the magnetizing coil. Thus in practice instead of operating the switch so as to cause the iron circuit to pass around its cycle of magnetization all that is necessary is to move the switch onward to the nearest position corresponding to the desired flux it being understood that the switch can only be moved one way that is to say in such a direction that the resulting change of current will always bring about an alteration of the flux in the same direction in the cycle of magnetization.

This cycle of magnetization as before mentioned is one in which the point of greatest density is as great as or greater than the maximum at which the clutch is ever intended to operate but whether or not any particular movement of the switch shall carry the magnetization of the iron through that maximum will depend upon the position of the switch. In other words if the clutch has been working with its magnetization on the up side of the curve representing the cycle and the flux has been in the positive direction then if a decrease of flux is required the only possible movement of the switch to bring about this decrease must necessarily take the density up to the maximum point and then bring it down on the down side of the curve but if for instance from this new position working on the down side of the curve a further decrease of the flux is necessary then a further movement of the switch will effect this reduction, which is in the same direction, without the necessity of carrying the magnetization of the iron around the cycle.

In carrying out this part of the invention it is convenient to employ a switch and a resistance in circuit with the magnetizing coil and to provide the switch with some ratchet mechanism or similar device so that it can only be turned in one direction.

There are sometimes cases in which it is unnecessary to cause the magnetization of the clutch always to pass around its cycle in the same direction, for instance in cases where the clutch has only one coil and where all that is essential is that the residual magnetism shall be eliminated.

Various arrangements have been proposed to meet the requirements of such simple cases some of them involving the use of a device operating to cause the magnetizing current to be reversed rapidly as it is gradually diminished. Other such arrangements have involved the use of a separate reversing coil or the division of the magnetizing coil into two parts.

The requirements of such cases may however be met by a simple modification of the present invention in which a single undivided magnetizing coil is employed so arranged that by the operation of a switch in conjunction with a resistance the magnetizing current can be gradually reduced without reversal to zero and then increased in the reverse direction to neutralize the residual magnetism.

Any convenient electrical arrangements may be employed to effect this. One suitable plan is to place the actuating or magnetizing coil in the position usually occupied by the galvanometer in a typical Wheatstone bridge diagram the arms of the bridge being resistances to which the source of electrical power is applied at opposite points. The conductors connected to the ends of the actuating coil may be slidable over the resistance arms so that rotation in one direction from the central position of zero current will gradually increase the current through the coil until the desired strength is attained, while rotation in the reverse direction from the full current position will first bring the current in the coil to zero and then—on passing through the zero position—gradually cause a current to flow through the coil in the opposite direction. As soon as this reverse current is sufficiently strong the residual magnetism is neutralized and the clutch members are restored magnetically to their original condition. Obviously a similar effect would be produced by making the contact connected to one end of the actuating coil stationary and causing the other contact to slide this being equivalent to a Wheatstone bridge with two "arms" of constant value and two variable arms.

In practice it is a great advantage to be able to reduce the current gradually to zero without reversal for if, as has been proposed, some rotating commutator or similar device is employed to give a series of reversals, the problem becomes practically one dealing with alternating currents instead of direct currents and the time factor introduces complications. In fact, if the operation be performed quickly the intended object is not attained unless the iron circuit be very thoroughly laminated and otherwise suitably designed.

Again the use of a single undivided magnetizing coil simplifies and cheapens the construction of the clutch.

The changes in the electrical circuits in the arrangements above described can be brought about by any suitable mechanism such for example as a hand lever, pedal or the like.

In the accompanying drawings,

Figure 1 is a diagram showing one set of electrical connections suitable for carrying out the first part of this invention the curve forming the lower part of the diagram indicating the magnetization cycle.

Fig. 2 illustrates one application of the invention to a clutch.

Fig. 3 is a section through a simple form of electromagnetic clutch having only one coil, and Fig. 4 is a diagram showing the electrical connections arranged after the manner of a Wheatstone bridge for carrying out the invention in a modified form.

With reference first to Fig. 1, A represents the magnetizing coil of the clutch having its ends joined to two contact arms C C' mounted on a spindle having a ratchet wheel D secured to it. The teeth of the ratchet wheel are engaged by a pawl D' so that the arms can only be rotated in one direction. The contact arms C C' work over a circular series of contacts connected to a resistance E opposite points E' E² of which are connected to a source of power which, for purposes of illustration, is shown as a battery F. If the arms C C' are rotated so that they join the points E' and E² the coil A will take its maximum current in one direction or the other and when the arms are at right angles to this position they will connect points of equal potential on the resistance E and no current will pass through the coil.

The curve forming the lower part of Fig. 1 represents the cycle of magnetization through which the iron circuit of the clutch is caused to pass by variation of the current in the coil A brought about by movements of the switch arms C and C'. As usual in curves of this type the magnetizing force H or ampere-turns is plotted horizontally and the magnetic induction or flux B vertically. The two points of greatest density on the curve indicate a flux as great as or greater than the maximum density at which the clutch is ever intended to work and these densities are reached when the arms C C' join the points E' and E² the direction of the flux depending upon whether the arm C or the arm C' is on the point E'.

Suppose now that the clutch has been working at the point G equivalent to a flux value two-thirds of the maximum and on the upward side of the curve. Suppose also that the arms C and C' have been in the position shown in full lines in the drawing and that it is desired to reduce the flux to one half of the previous value i. e. to one-third of the possible maximum. What must not be done is to reduce the current directly for that would mean that the magnetization of the iron would depart from its proper cycle and would start at a downward curve having its apex at the point G. Such a direct reduction of the current is however impossible for as will be seen by reference to the figure the arms C C' cannot be moved clockwise on account of the ratchet D and pawl D' and therefore any movement of the switch must be in a counterclockwise direction. Such movement has the effect of increasing the flux until, when the arms C C' are horizontal the maximum is reached. Further movement in the same direction then reduces the flux which consequently falls on the down side of the cycle until presently the point J is reached. At this point the flux is one-third of the maximum and is still in the same direction i. e. the vertical ordinates are still positive or above the horizontal line of origin, but the magnetomotive force is negative or to the left of the vertical line of origin. The position of the switch arms C C' is now as indicated by the dotted line joining the points j and j' and obviously in getting to this point the current in the clutch coil has been reduced to zero and then slightly reversed. The effective flux at the point J is therefore due mainly to residual magnetism but nevertheless this point on the cycle will be perfectly stable and the clutch may be worked there.

Reference to the curve will show that besides the point J there are three other points J', J² and J³ having a flux value of one-third of the maximum. One of these other points J' is reached by continuing the rotation of the switch arms C C' until they join the points j² j³ the arm C making contact at j². This again would be a working position for the clutch with the flux in its iron at one-third of the maximum value. Further rotation of the arms C C' in a counterclockwise direction will bring the arm C to the point j' and the arm C' to the point j and the flux will then be at the point J². Still further rotation will bring the arm C to the point j³ and the arm C' to the point j² the effect of this movement being to carry the magnetization from the point J² up on the up side of the cycle to the point J³. In this position the arms C and C' lie just behind the original assumed starting point indicated in full lines.

This nearly complete rotation of the switch arm is only necessary in cases where the iron is to be taken around its cycle; in other instances it is sufficient to move the switch arms only so far as may be necessary to reach the nearest position corresponding to the required new value of the flux density.

Obviously whether the flux has to be increased to the maximum or not for any particular alteration of the flux value will depend entirely upon the nature of the change and the part of the cycle upon which the clutch is working. For instance if after working at the point J³ it was desired to work at the point G all that would be necessary would be to move the switch arms C, C' slightly farther in order to increase the current for the points J³ and G are both on the up side of the curve and therefore it is not necessary to take the flux up to its maximum value.

The applications of the invention are numerous but Fig. 2 is an example of one application. In this figure a typical electromagnetic friction clutch is shown coupling two shafts. One of these K is the driving shaft rotated by any source of power and the other K' is the driven shaft to which power is transmitted through the clutch for doing mainly, or at any rate partly, mechanical work. The clutch is provided with an actuating coil A' acting to produce driving pressure between the clutch members and with an opposing coil A² which is energized by current from a small dynamo L driven through the clutch and taking only a portion—preferably a small portion—of the power transmitted. The actuating coil A' is energized from some source of constant voltage such as the mains F' the switch C² and resistance controlling the current in the coil being arranged in a manner similar to that described with reference to Fig. 1.

The opposing coil A² is likewise provided with a switch C³ and a resistance connected similarly and it is convenient though not essential that the switches C² and C³ should be mechanically connected so that they rotate together.

The function of the opposing coil A² in this arrangement is not to make the clutch slip when the torque transmitted exceeds a predetermined amount but rather to assist the picking up action of the clutch when slip has started through an overload or to tend to prevent or counteract the tendency for the slip to increase unduly. If, when the clutch is running at full speed, the driving pressure produced by the effect of the actuating coil minus the effect of the opposing coil is just sufficient to transmit the load, an increase of load will cause the clutch to slip. If there were no opposing coil, directly the clutch slipped the speed of the driven member would fall considerably since the coefficient of friction diminishes when once the clutch surfaces start slipping. Further, the load would have to be reduced considerably below that which started the clutch slipping before the clutch could pick up the work again. With the opposing coil, however, directly slip commences the voltage of the small dynamo driven through the clutch falls, less current passes through the opposing coil and consequently the driving pressure due to the main or actuating coil is increased.

The dynamo driven through the clutch is in this instance, to be regarded primarily merely as a regulator for the clutch and, as above mentioned, is not intended to take any appreciable proportion of the power transmitted by the clutch.

This arrangement is only given as one example of the use of the invention as applied to a differential electromagnetic friction clutch but it is obvious that wherever the magnetic effect of one coil of the clutch is intended to have a definite relation to the effect of another coil of the clutch the cyclic magnetization of the iron circuit according to this invention is of importance as it obviates any element of uncertainty which might otherwise be present owing to the effect of residual magnetism.

With reference now to Fig. 3 this shows a simple form of electromagnetic clutch having only one magnetizing or actuating coil. The two shafts to be coupled are lettered M and N. The clutch member O is mounted on the shaft M and has an actuating coil P which can be energized by current supplied to the slip rings R. The other clutch member O' is mounted on the shaft N and is kept in driving engagement with the member O when the coil P is energized.

Fig. 4 is a diagram showing one method of connecting the coil P to the clutch so that the effect of residual magnetism is counteracted according to this invention. The coil P is connected to two contact arms S and S' which make sliding connection with the resistance T. The source of power, shown by way of example as a battery V, is connected to opposite points of the resistance T the whole arrangement being similar to that of a Wheatstone bridge in which the place of the galvanometer is taken by the clutch coil P. When the contact arms S and S' are in the position shown in full lines in Fig. 4 the coil P takes its maximum current and when the arms occupy the positions shown in dotted lines no current will pass through the coil P. In operation the contact arms S and S' are moved back from the position which they occupy when the clutch is working through the dotted no-current position on to a position were the current, now in the reverse direction, will counteract the residual magnetism in the clutch members O and O'.

What we claim as our invention and desire to secure by Letters Patent is:—

1. The combination with an electromagnetic friction clutch, of a magnetizing coil and means for controlling the current in such coil so that changes in the magnetic flux in the iron circuit of the clutch must always take place in the same direction in the cycle of magnetization.

2. The combination with an electromagnetic friction clutch, of a magnetizing coil, a resistance, and a switch controlling the resistance so arranged that changes in the magnetic flux in the iron circuit of the clutch must always take place in the same direction in the cycle of magnetization.

3. The combination with an electromagnetic friction clutch, of means whereby the iron circuit of the clutch is placed in a definite magnetic condition by causing it to pass around a cycle of magnetization the point of greatest density in such cycle being as great as or greater than the maximum at which the clutch is ever intended to operate.

4. The combination with an electromagnetic friction clutch of a magnetizing coil, a resistance, a switch controlling the resistance, and means for controlling the motion of such switch so that it can only be moved in such a direction that the resulting change of current in the magnetizing coil will always bring about an alteration of the magnetic flux in the same direction in the cycle of magnetization.

5. The combination of an electromagnetic friction clutch, a magnetizing coil tending to produce driving pressure between the clutch members, a second coil tending to oppose the action of the magnetizing coil, two resistances in circuit with the magnetizing and opposing coils respectively, and switches controlling the resistances such switches being so arranged that any alterations in the currents in the coils can only take place in such a way that the resulting change in the magnetic flux always takes place in the same direction in the cycle of magnetization.

6. The combination of an electromagnetic friction clutch, a magnetizing coil tending to produce driving pressure between the clutch members, a dynamo driven through the clutch, a second coil tending to oppose the action of the magnetizing coil such second coil being energized by a current proportional to the voltage of such dynamo, two resistances in circuit with the magnetizing and opposing coils respectively, and switches controlling the resistances such switches being so arranged that any alterations in the currents in the coils can only take place in such a way that the resulting change in the magnetic flux always takes place in the same direction in the cycle of magnetization.

7. The combination with an electromagnetic friction clutch, of a single undivided magnetizing coil, a resistance, and a switch controlling the resistance the arrangement being such that in declutching, the magnetizing current is gradually reduced to zero without reversal and then increased in the reverse direction to neutralize the residual magnetism in the iron circuit of the clutch.

8. The combination with an electromagnetic friction clutch, of a magnetizing coil, a resistance connected to such coil after the manner of a Wheatstone bridge, and a switch controlling the said resistance so that in declutching, the magnetizing current is gradually reduced to zero without reversal and then increased in the reverse direction to neutralize the residual magnetism in the iron circuit of the clutch.

In testimony whereof we have signed our names to this specification.

ALFRED SOAMES.
WALTER LANGDON-DAVIES.